(12) United States Patent
Tomoyuki et al.

(10) Patent No.: US 7,536,989 B2
(45) Date of Patent: May 26, 2009

(54) FUEL TANK COVER BODY

(75) Inventors: Tanaka Tomoyuki, Niigata (JP); Koide Shigeki, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 866 days.

(21) Appl. No.: 10/522,575

(22) PCT Filed: Jul. 14, 2003

(86) PCT No.: PCT/JP03/08946

§ 371 (c)(1), (2), (4) Date: Jan. 28, 2005

(87) PCT Pub. No.: WO2004/013586

PCT Pub. Date: Feb. 12, 2004

(65) Prior Publication Data

US 2006/0042378 A1 Mar. 2, 2006

(30) Foreign Application Priority Data

Jul. 31, 2002 (JP) .............................. 2002-223956
Jul. 31, 2002 (JP) .............................. 2002-223957

(51) Int. Cl.
*B60K 15/05* (2006.01)
*B60K 35/00* (2006.01)
*G01F 23/00* (2006.01)
*G01F 23/36* (2006.01)

(52) U.S. Cl. .................. 123/198 E; 73/290 R; 73/306; 73/313; 73/317; 220/212; 220/694; 220/DIG. 33; 280/830

(58) Field of Classification Search .............. 123/509, 123/198 E; 73/314, 317, 318, 320, 321, 322, 73/290 R, 306, 313, 866.5; 180/69.4–69.5; 206/205, 459.1; 220/212, 694, 905, DIG. 33; 280/830

See application file for complete search history.

(56) References Cited

U.S. PATENT DOCUMENTS

| 1,920,971 | A | * | 8/1933 | De Giers ..................... 73/317 |
| 4,479,116 | A | * | 10/1984 | Kobayashi .................. 340/620 |
| 4,574,631 | A | * | 3/1986 | Johnson, Jr. ................ 73/317 |
| 4,825,695 | A | * | 5/1989 | Ohtani ..................... 73/290 R |
| 5,649,514 | A | * | 7/1997 | Okada et al. ............. 123/509 X |
| 5,782,223 | A | * | 7/1998 | Yamashita et al. ....... 123/509 X |
| 5,900,148 | A | * | 5/1999 | Izutani et al. ............. 210/416.4 |
| 6,138,524 | A | * | 10/2000 | Tsuda et al. ............... 73/866.5 |
| 6,293,770 | B1 | * | 9/2001 | Matsumoto et al. ......... 417/361 |

FOREIGN PATENT DOCUMENTS

FR 2597973 A1 * 10/1987 .............. 73/290 R
GB 1078226 A * 8/1967

(Continued)

*Primary Examiner*—Thomas P Noland
(74) *Attorney, Agent, or Firm*—McDermott Will & Emery LLP

(57) ABSTRACT

A fuel tank cover body which can be easily manufactured. The fuel tank cover body comprises a cover 2 for closing the opening of a fuel tank; a liquid level detection unit 3 housed in the fuel tank; and a bracket 4 acting as a fixing portion for fixing the liquid level detection unit 3 and disposed in the cover 2. The cover 2 and the bracket 4 are integrally formed of a resin.

5 Claims, 8 Drawing Sheets

FOREIGN PATENT DOCUMENTS

| | | | | |
|---|---|---|---|---|
| JP | 147932/1986 | 9/1986 | | |
| JP | 62053228 A | * 3/1987 | ................ | 220/288 |
| JP | 123522/1987 | 8/1987 | | |
| JP | 118327/1989 | 8/1989 | | |
| JP | 07280248 A | * 10/1995 | | |
| JP | 11237275 A | * 8/1999 | | |

* cited by examiner

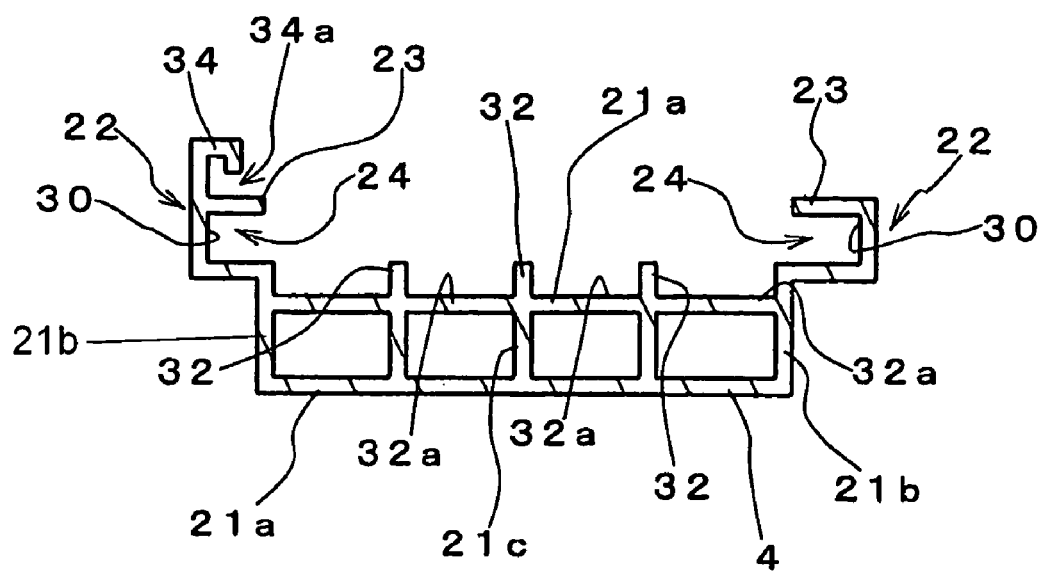
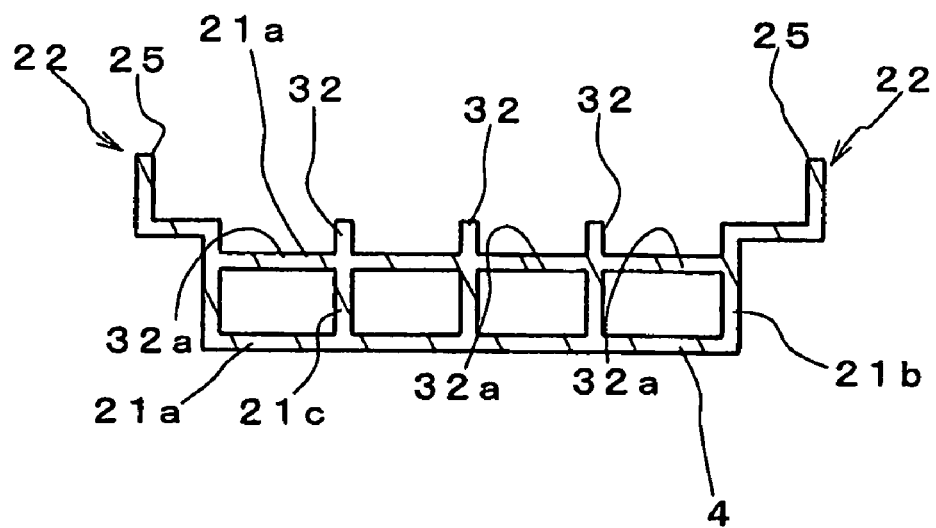
Fig. 5

FUEL TANK COVER BODY

TECHNICAL FIELD

The present invention relates to a fuel tank cover body, in which a fixing portion for fixing a liquid level detection unit to detect the liquid level of a fuel in a fuel tank is fixed on a cover for closing the opening of the fuel tank.

BACKGROUND ART

In the prior art, the cover for closing the opening of the fuel tank is provided with the fixing portion for fixing the liquid level detection unit to detect the liquid level of the fuel in the fuel tank, as disclosed in JP01-118327U.

In this invention, a connector lock portion and a bracket having the liquid level detection unit formed integrally in advance are insert-molded at the time of molding the cover.

In this prior art, however, before the cover is molded, the parts such as the bracket having the liquid level detection unit have to be formed so that the molding works are complicated. Therefore, the invention has an object to provide a fuel tank cover body, which can be easily manufactured.

DISCLOSURE OF THE INVENTION

According to the invention, there is provided a fuel tank cover body comprising: a cover for closing the opening of a fuel tank; a liquid level detection unit stored in the fuel tank; and a fixing portion disposed in the cover for fixing the liquid level detection unit. The cover and the fixing portion are integrally formed of a resin. With this construction, it is possible to provide a fuel tank cover body, which can be easily manufactured.

Moreover, the fixing portion includes two plate portions and a connecting portion for connecting the plate portions. With this construction, it is possible to provide a fuel tank cover body which can be easily manufactured and which has the fixing portion improved in rigidity.

Moreover, the fixing portion is formed into a tubular member having a connecting portion inside for connecting the walls of the tubular member. With this construction, it is possible to provide a fuel tank cover body which can be easily manufactured and which has the fixing portion improved in rigidity.

Moreover, the fixing portion is formed into a tubular member having a rectangular sectional shape, in which the connecting portion for connecting the walls of the longer sides of the tubular member is disposed. With this construction, it is possible to provide a fuel tank cover body which can be easily manufactured and which has the fixing portion improved in rigidity.

Moreover, the center point of the cover is located in such a projected portion, in which the liquid level detection unit and the fixing portion are assembled, as is projected in the direction normal to the plate face of the cover. With this construction, it is possible to provide a fuel-tank cover body which can have the cover minimized in size to achieve a size reduction and which is hardly subject to a stress at the molding time and is hardly deformed because the bracket or a relatively large portion is located at the center position.

Moreover, the fuel tank cover body further comprises: guided portions disposed in the liquid level detection unit and extending in the assembling direction to the fixing portion; guide portions disposed in the fixing portion for guiding the guided portions; and protruding walls disposed at the connecting portions for connecting the guide portions, to contact with the liquid level detection unit and to extend in the same direction as the assembling direction. With this construction, it is possible to provide a fuel tank cover body which can be easily manufactured and which can have the liquid level detection unit assembled easily with the fixing portion made of a resin.

Moreover, the fuel tank cover body further comprises: guided portions disposed in the liquid level detection unit and extending in the assembling direction to the fixing portion; guide portions disposed in the fixing portion for guiding the guided portions; and protruding walls disposed at the liquid level detection unit for contacting with connecting portions to connect the guide portions and for extending in the same direction as the assembling direction. With this construction, it is possible to provide a fuel tank cover body which can be easily manufactured and which can have the liquid level detection unit assembled easily with the fixing portion made of a resin.

BRIEF DESCRIPTION OF THE DRAWINGS

FIG. 4 is a section along line B-B of FIG. 3;

FIG. 5 is a section along line C-C of FIG. 3;

BEST MODE FOR CARRYING OUT THE INVENTION

Figure 1:
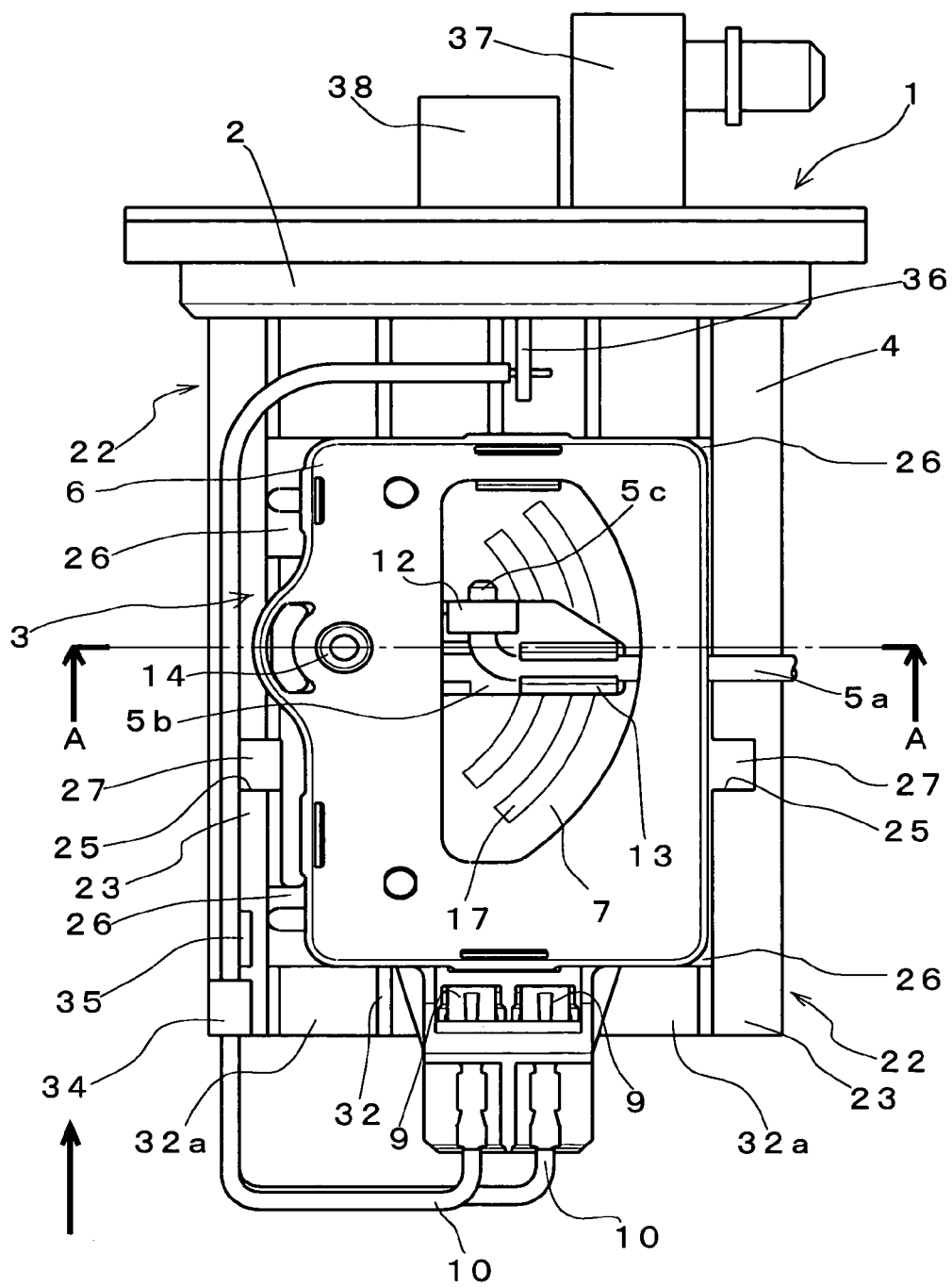
FIG. 1 is a front elevation of one embodiment of the invention.
Figure 2:
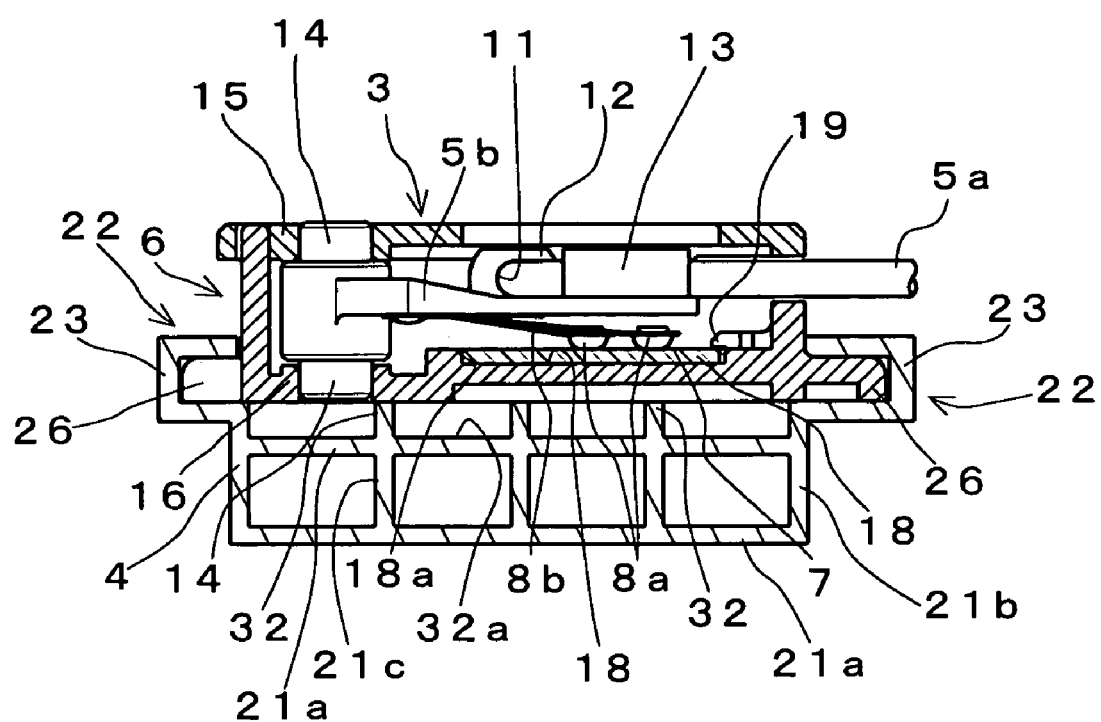
FIG. 2 is a section along line A-A of FIG. 1.

One embodiment of a fuel tank cover body of the invention will be described with reference to the accompanying drawings.

The invention is described on the case, in which the invention is applied to a vehicle such as an automobile. The fuel tank cover body 1 is provided with a cover 2 and a bracket 4 acting as a fixing portion for fixing a liquid level detection unit 3. These cover 2 and bracket 4 are integrally formed of a resin such as polyacetal. The cover 2 closes the opening of a not-shown fuel tank.

The liquid level detection unit 3 of the embodiment is provided with: a float arm 5a associated with the not-shown float on the liquid surface of the not-shown fuel tank; an arm holder 5b for moving as the float arm 5a turns; a body frame 6 for supporting the arm holder 5b turnably; a circuit board 7 fixed in the body frame 6; a contact holding member 8b having a sliding contact 8a for sliding on the circuit board 7 and fixed on the arm holder 5b; terminals 9 connected electrically with the circuit board 7; and lead wires 10 for connecting the terminals 9 and the not-shown external circuit. As the liquid level fluctuates, the sliding contact 8a slides on the circuit board 7 through the float, the float arm 5a and the arm holder 5b, so that the voltage fluctuation to be caused by the not-shown resistor disposed on the circuit board 7 is outputted through the lead wires 10 to the not-shown external circuit.

The float arm 5a has a rod shape and made of a metal and is provided at its leading end with the not-shown float to float on the liquid surface. The float arm 5a has its other end portion 5c bent.

The arm holder 5b is made of a synthetic resin and provided with: a holding portion 12 having a hole 11, through which the bent end portion 5c of the float arm 5a extends; and a holding member 13 for holding the float arm 5a on the two sides. These holding portion 12 and holding member 13 position and fix the float arm 5a on the arm holder 5b.

The float arm 5a is assembled on the arm holder 5b by inserting the end portion 5c of the float arm 5a into the hole 11 of the holding portion 12 and by turning the arm holder 5b on the axis of the end portion 5c held turnably by the holding portion 12, in the axial direction of pin portions 14, thereby to deform the holding member 13 of the arm holder 5b elastically to hold the float arm 5a, so that the turn of the float arm 5a is blocked. The float arm 5a can thus be easily assembled with the arm holder 5b. The arm holder 5b can be turned at its two pin portions 14 or its turning fulcrums by two spaced bearing portions 15 and 16 of the body frame 6. Thus, this assembly provides a structure which is simpler and thinner in the direction of the pin portions 14 than that of the prior art.

The circuit substrate 7 is made of ceramics and is provided on its surface with conductors 17 and the not-shown resistors. This circuit substrate 7 is fixed in the body frame 6. This body frame 6 is provided with: a recess 18 for housing the circuit substrate 7; and elastic members 20 having retaining pawls 19 for retaining the individual opposed sides of the circuit substrate 7 having a rectangular shape. By the elastic members 20 having those retaining pawls 19, the circuit substrate 7 is pushed and fixed on the sidewalls 18a forming the recess 18. The terminals 9 are formed of a metal by bending a sheet-shaped member.

The bracket 4 or the fixing portion of the liquid level detection unit 3 has a tubular shape. In this embodiment, this tubular member has a rectangular sectional shape and is constructed of walls: two plate portions 21a for the longer sides; and two plate portions 21b for the shorter sides. The plate portions 21a for the longer sides are connected to each other by means of connecting portions 21c. In this case, the plate portions 21b for the shorter sides forming a portion of the tubular member are also included in the connecting portions.

The bracket 4 of this embodiment is formed by joining the rectangular shapes or polygonal shapes, so that it is less deformable than that which is shaped to have one plate and ribs for reinforcing the plate. This rectangular shape is desired, if possible, to be a square or a regular polygon. In case there is a limit to the size of product, the bracket 4 is preferred to be as close to the square as possible. By thus forming the bracket 4, in case the bracket 4 is formed integrally with the cover 2, it can be prevented from being shrunken and deformed due to the curing of the resin at the molding time.

Because of the shape which is hard to be deformed, moreover, the bracket 4 can be a product having a designed angle with respect to the cover 2, i.e., a product having a right angle in this embodiment. Here, this angle of the bracket 4 with respect to the cover 2 should not be limited to the right angle but can be set at an arbitrary value.

Here, the sectional shape of the bracket should not be limited to that of the embodiment but may be a tubular shape having a semicircular section, although not shown. Moreover, the connecting portions 21c can give reasonable actions and effects, if they have a length equivalent to that of the bracket 4, but need not have the equivalent length.

One of the two plate portions 21a for the longer sides of the bracket 4 is provided on its outer face with guide portions 22 for guiding the liquid level detection unit 3. These two guide portions 22 are formed integrally with the bracket 4 to form guide walls 23 having the shape of letter C (or the shape of fallen letter U). These guide walls 23 are opened to have open portions 24 confronting each other. The portion connecting the two guide portions 22 is a connecting portion, which corresponds to the plate portion 21a in this embodiment.

The guide walls 23 are provided with engaging portions 25 by cutting off portions of the guide walls 23 in a rectangular shape. Here, the engaging portions 25 may also be formed by dividing the guide walls 23 into two and by cutting off the divided guide walls 23.

Figure 3:
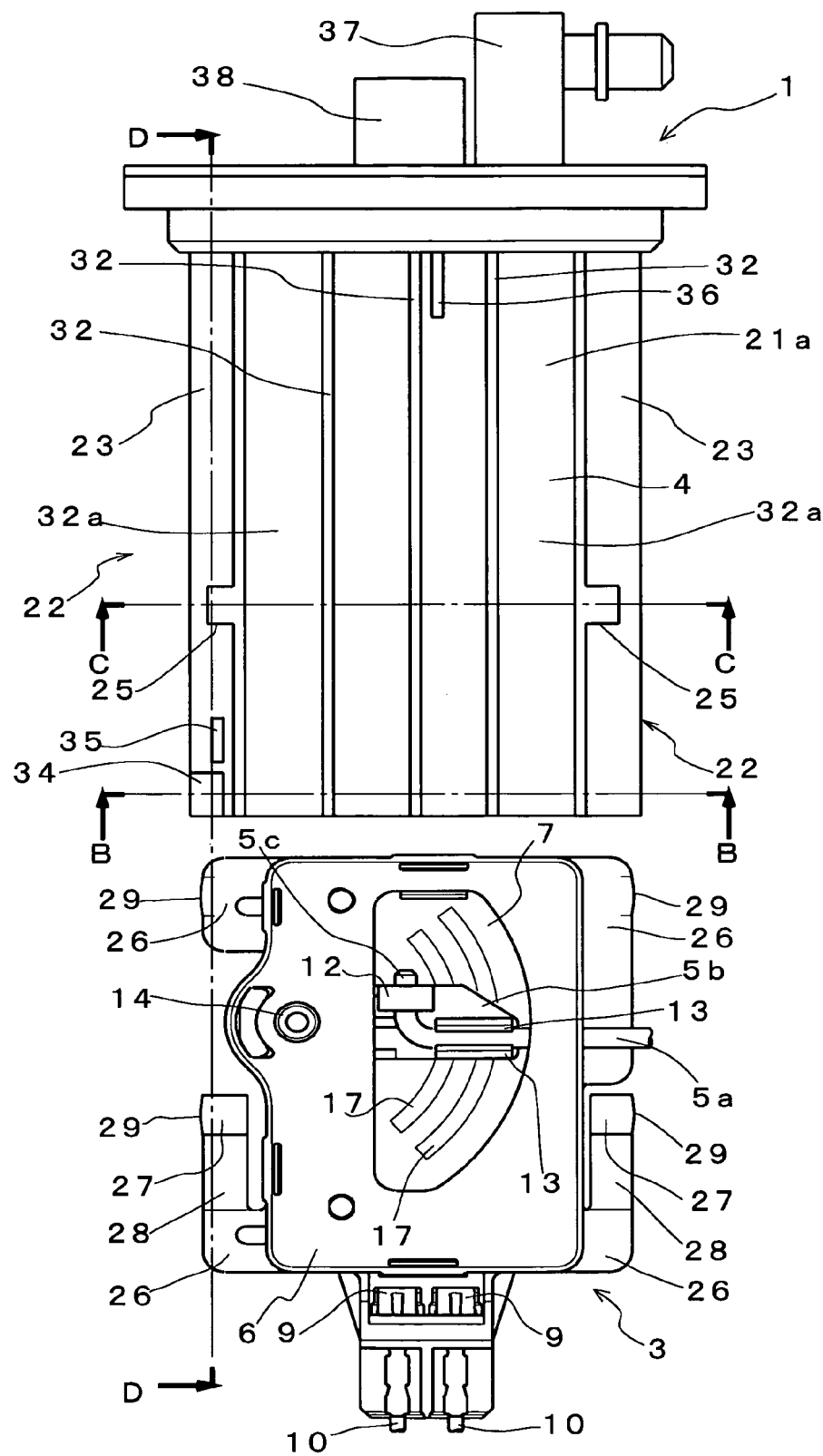
FIG. 3 is a front elevation before the same embodiment is assembled.

The body frame 6 of the liquid level detection unit 3 to be guided by those guide portions 22 is formed of a synthetic resin such as polyacetal and is provided with protruding members 26 as guided portions to be guided by the guide portions 22. In this embodiment, four protruding members 26 are formed (as referred to FIG. 3), and the left and right ones of which are spaced from each other, as viewed in FIG. 3. When the protruding members 26 are fitted in the guide walls 23, they are guided by the guide walls 23.

Moreover, one of the paired left and right protruding members 26 is provided with an elastic member 28 having a retaining portion 27 to be retained on the engaging portion 25. This elastic member 28 is positioned (as referred to FIG. 3) between the paired upper and lower protruding members 26 disposed on each of the left and right sides. Here, the elastic members 28 need not be extended from the protruding members 26 but may also be extended directly from the body frame 6. In this embodiment, moreover, the retaining portions 27 are formed into such a rectangular prism as to fit the engaging portions 25. As a result, the retaining portions 27 are fitted in the engaging portions 25 so that the liquid level detection unit 3 is fixed in the direction where they are guided by the guide portions 22.

At a portion of the side face each protruding member 26 and at the leading end of the elastic member 28, on the other hand, rounded protruding portions 29 are formed and are press-fitted between the guide portions 22 while abutting against the deep faces 30 of the guide walls 23. As a result, the liquid level detection unit 3 does not clutter between the guide portions 22.

Moreover, three protruding walls 32 are formed at a portion of the bracket 4 connecting the guide walls 23 and at on one of the plate portions 21a or the connecting portions. Recesses 32a are formed between those protruding walls 32. The protruding walls 32 contact with the liquid level detection unit 3 and extend in the same direction as that, in which the liquid level detection unit 3 is assembled with the bracket 4.

Figure 10:
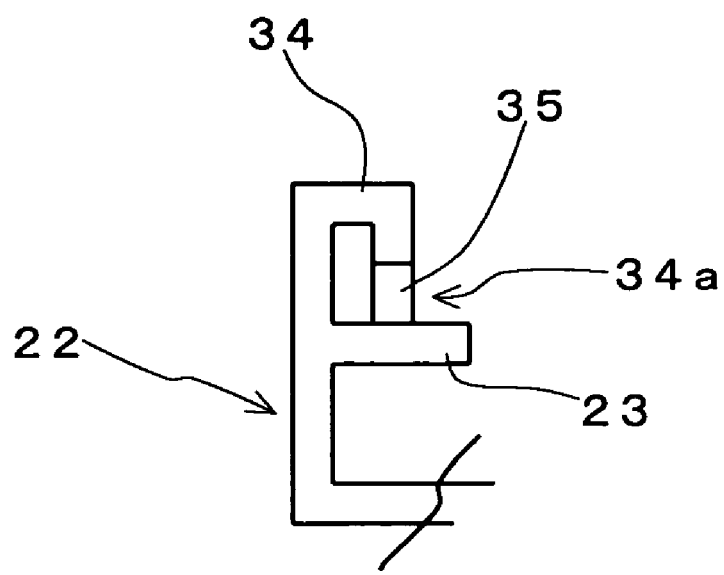
FIG. 10 is a top plan view of the cord clamp, as taken in the direction of arrows in FIG. 1.

The guide walls 32 are provided with a cord clamp 34 for fixing the lead wires 10, and an escape preventing portion 35 for preventing the lead wires 10 from escaping from the cord clamp 34. This cord clamp 34 has a hooked sectional shape having an opening 34a, and has its width set substantially identical to that of the lead wires 10. On the other hand, the escape preventing portion 35 is formed into a protruding shape and is disposed at such a position distant from the cord clamp 34 more than the thickness of the lead wires 10 that the lead wires 10 may be easily fitted in the cord clamp 34 (as referred to FIG. 3, FIG. 4, FIG. 9 and FIG. 10). Moreover, the cord clamp 34 and the escape preventing portion 35 are disposed, as viewed (in FIG. 10) in the direction of an arrow in FIG. 1, to enclose the lead wires 10. The opening 34a of the cord clamp 34 is so seen as if it were covered with the escape preventing portion 35. With this formation, the lead wires 10 are preventing from escaping from the cord clamp 34.

Here, the position of the escape preventing portion 35 relative to the cord clamp 34 may be distant by the thickness of the lead lines 10 or less with respect to the opening 34a, in case it is viewed in the direction where the lead wires 10 pass through the cord clamp 34 (that is, in the arrow direction of FIG. 1). In other words, the escape preventing portion 35 may also be arranged as to cover the opening 34a, in case it is seen in the arrow direction of FIG. 1. In this case, too, the escape preventing portion 35 is disposed at a position distant from the cord clamp 34 more than the thickness of the lead wires 10, in case it is viewed in the direction perpendicular to the direction (i.e., the arrow direction in FIG. 1) where the lead wires 10 pass through the cord clamp 34.

Here is described a method for attaching the liquid level detection unit 3 to the bracket 4. The protruding members 26 of the liquid level detection unit 3 are fitted on the guide walls 23; the liquid level detection unit 3 is slid along the bracket 4; and the protruding members 26 are moved along the guide walls 23. Then, the retaining portions 27 can move on the guide walls 23 as the elastic members 28 warp. When the retaining portions 27 reach the portions of the guide walls 23 where the engaging portions 25 are formed, the retaining portions 27 having pushed the inner faces of the guide walls 23 with the elastic members 28 are retained by the engaging portions 25 so that the liquid level detection unit 3 is fixed on the bracket 4.

Merely by thus guiding and moving the liquid level detection unit 3 along the guide walls 23 to retain the retaining portions 27 on the engaging portions 25, the liquid level detection unit 3 is completely fixed on the bracket 4. Even if the fixing parts such as screws are not used, therefore, the liquid level detection unit 3 can be fixed on the bracket 4 acting as the fixing portion so that the works can be facilitated.

Moreover, the protruding walls 32 are formed on the plate portion 21a acting as the connecting portion of the bracket 4 so that the contact area between the liquid level detection unit 3 and the bracket 4 can be reduced when the liquid level detection unit 3 is assembled with the bracket 4. Thus, the body frame 6 can be easily moved to facilitate the assembly. In this embodiment, the protruding walls 32 are disposed on the side of the fixing portion such as the bracket 4. However, this disposition is not limited to the aforementioned embodiment, but effects similar to those of the embodiment could be obtained even if the protruding walls 32 were disposed on the side of the body frame 6.

Figure 6:
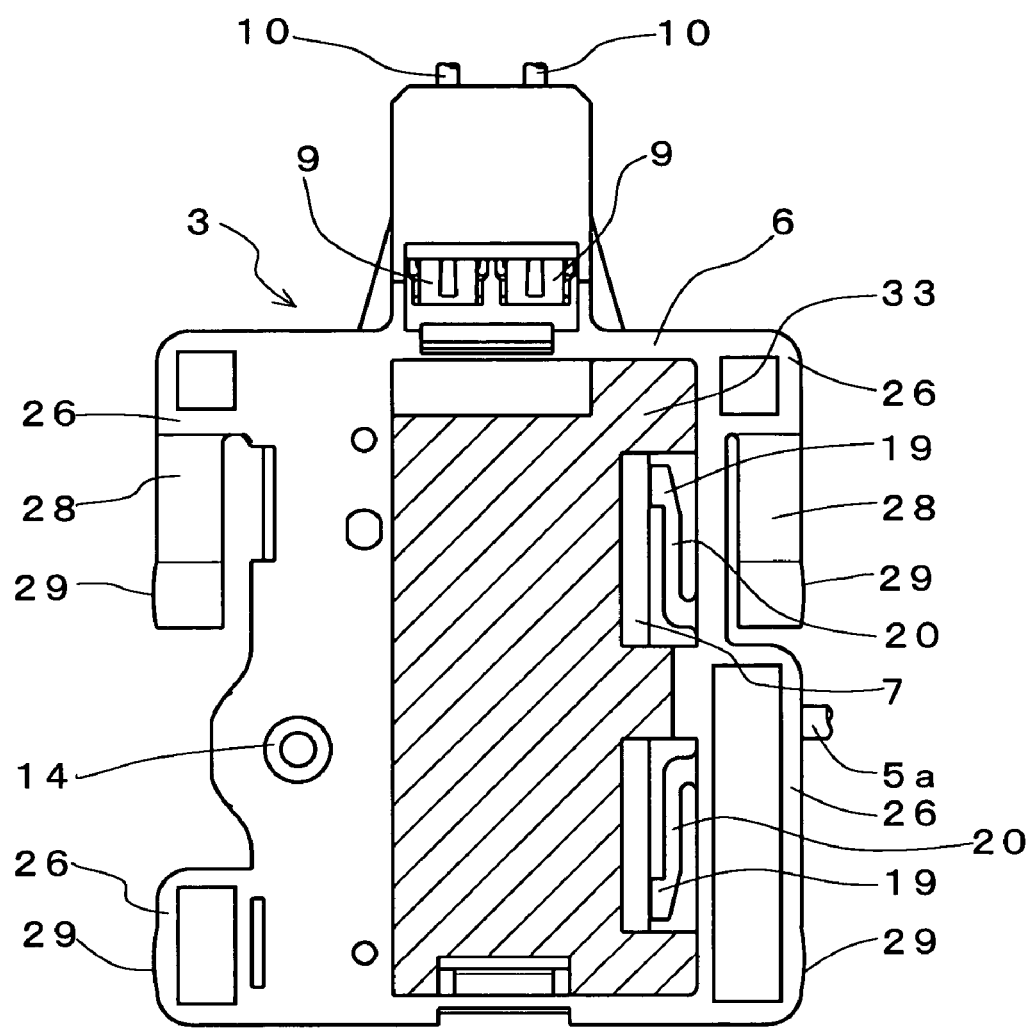
FIG. 6 is a rear view of a liquid level detection unit of the same embodiment.
Figure 7:
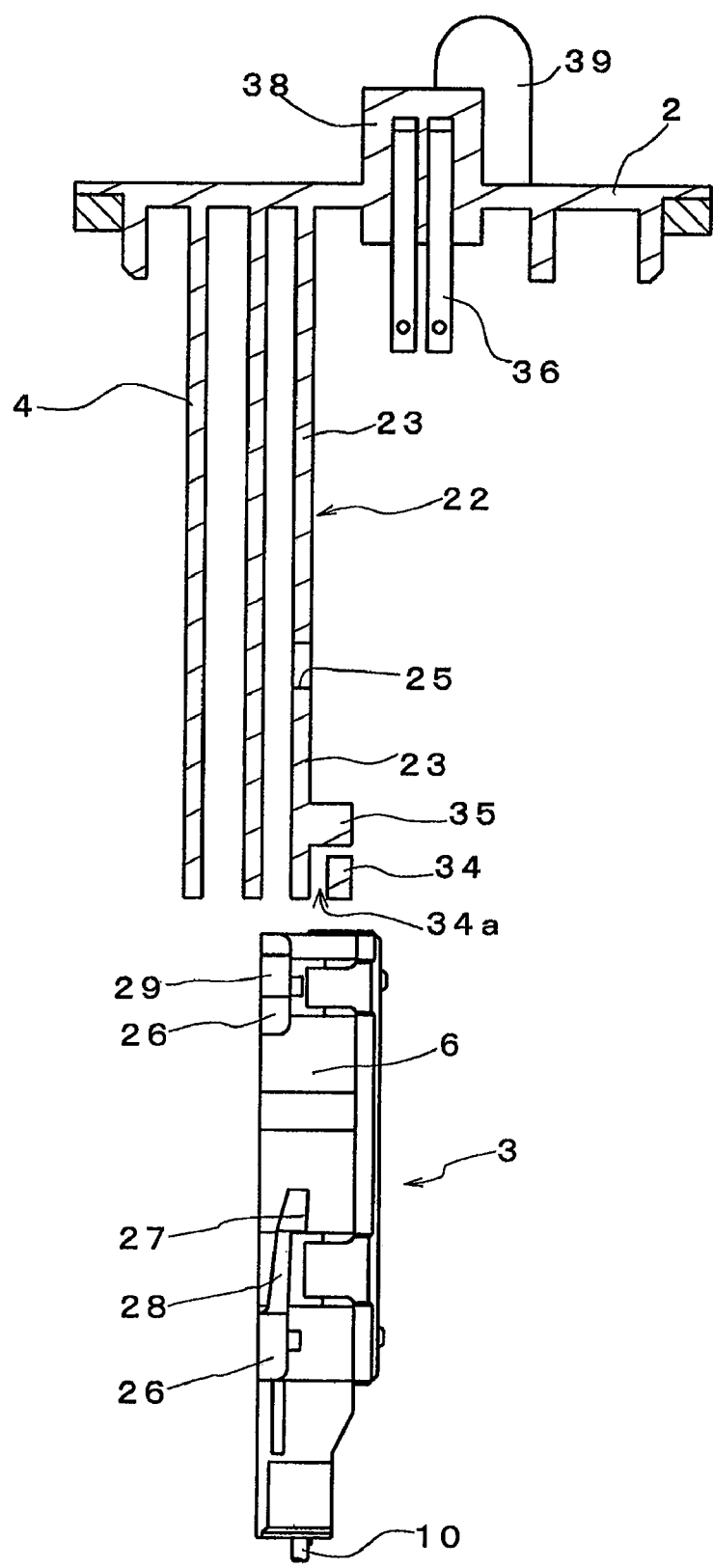
FIG. 7 is a section along line D-D of FIG. 3.

Here, a recess 33 (shown as hatched in FIG. 6) is formed in a portion of that face of the body frame 6 of the liquid level detection unit 3, which confronts the bracket 4. This recess 33 can further reduce the contact area with the protruding portions 32 and can improve the assemblability.

Here, the invention is effective especially for the structure, in which the contact area between the liquid level detection unit 3 and the fixing portion such as the bracket 4 is large and in which the liquid level detection unit 3 is slid along the fixing portion.

In the aforementioned embodiment, the protruding walls 32 are so continuous as has not cut. However, the invention should not be limited to the embodiment, but the protruding walls 32 may be partially divided to make point contacts. In this modification, the protruding walls for the point contacts are so formed that they are arrayed in the same direction as the aforementioned assembly direction.

With the cover portion 2 of the embodiment, moreover, there are integrally formed: terminals 36, with which the lead wires 10 are connected by a not-shown solder; and a pipe unit 37 which connects the inside and the outside of the aforementioned fuel tank. The terminals 36 construct a portion of a connector unit 38, by which detected signals are outputted from the liquid level detection unit 3 to the not-shown instruments. Here, the embodiment is provided with a metallic pipe, which is connected to the pipe unit 37 and extends into the fuel tank, although not shown.

Figure 8:
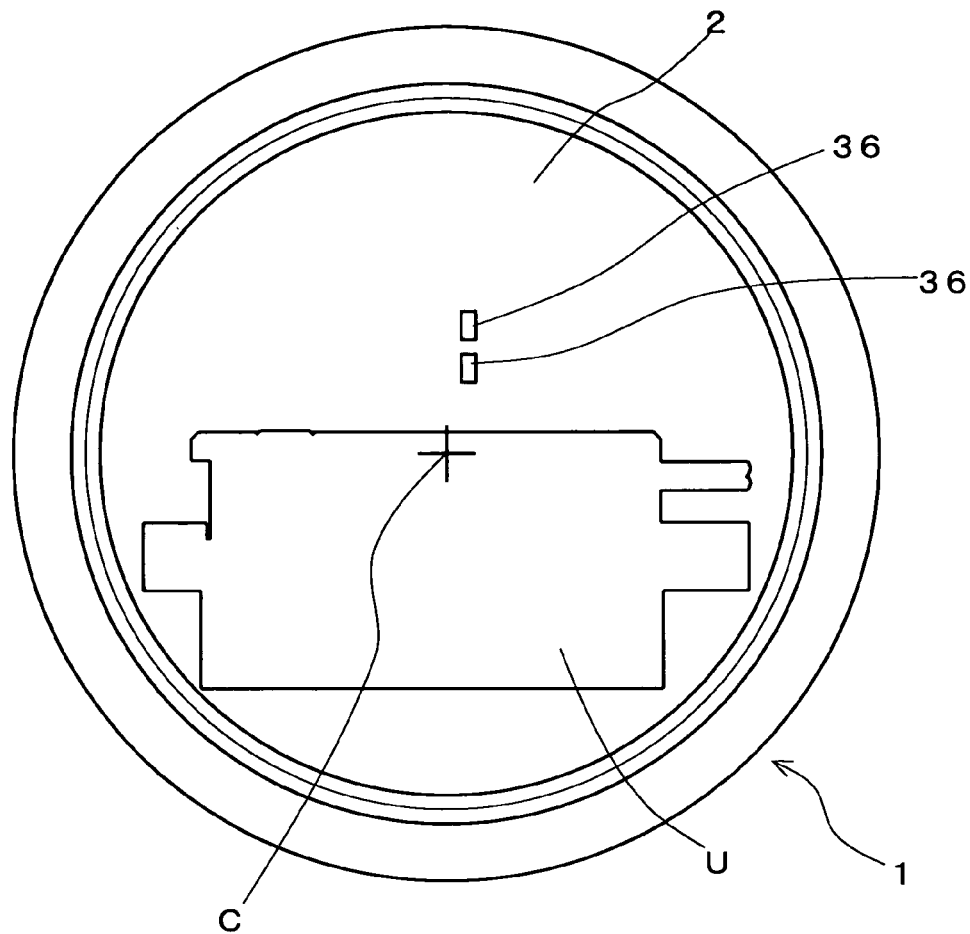
FIG. 8 is a top plan view taken in the direction of arrows in FIG. 1.
Figure 9:
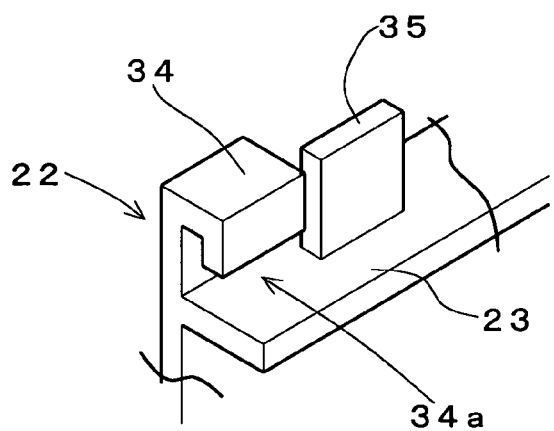
FIG. 9 is a perspective view of a cord clamp of the same embodiment.

As shown in FIG. 8, moreover, a center point C of the cover portion 2 is disposed in such a projected portion U of the assembly of the liquid level detection unit 3 and the bracket 4 as is projected in a direction normal (i.e., in the arrow direction of FIG. 1) to the plate face of the cover portion 2. With this construction, it is possible to provide an easily manufacturable fuel tank cover body and to minimize the size of the cover 2 and attain a miniaturization. Of the portions constructing the fuel tank cover body 1, moreover, the relatively large bracket 4 is located at the center position. It is, therefore, possible to provide the fuel tank cover body 1, to which a stress is hardly applied when it is molded, so that it is hardly deformed.

INDUSTRIAL APPLICABILITY

The invention is suited for the fuel tank cover body and especially for the fuel tank cover body which is provided with the fixing portion for fixing the liquid level detection unit.

The invention claimed is:

1. A fuel tank cover body comprising:
   a cover for closing the opening of a fuel tank;
   a liquid level detection unit stored in said fuel tank; and
   a fixing portion disposed in said cover for fixing the liquid level detection unit, characterized in that said cover and said fixing portion are integrally formed of a resin, and said fixing portion comprises two plate portions and connecting portions connecting said two plate portions, said two plate portions and said connecting portions forming tubular members.

2. The fuel tank cover body as set forth in claim 1, characterized in that said tubular members have a rectangular sectional shape.

3. The fuel tank cover body as set forth in claim 1, characterized in that a center point of said cover is located in a face plate of said cover, from which said liquid level detection unit and a portion of said fixing portion project in a direction normal thereto.

4. The fuel tank cover body as set forth in claim 1, characterized by further comprising:
   guided portions disposed in said liquid level detection unit and extending in an assembling direction to said fixing portion;
   guide portions disposed in said fixing portion for guiding said guided portions; and
   protruding walls disposed at connecting portions of said guide portions for connecting said guide portions, to contact with said liquid level detection unit and extending in the same direction as said assembling direction.

5. The fuel tank cover body as set forth in claim 1, characterized by further comprising:
   guided portions disposed in said liquid level detection unit and extending in an assembling direction to said fixing portion;
   guide portions disposed in said fixing portion for guiding said guided portions; and
   protruding walls disposed at connecting portions of said guided portions in said liquid level detection unit for contacting with said guide portions and extending in the same direction as said assembling direction.

* * * * *